(12) United States Patent
Thompson

(10) Patent No.: US 11,701,699 B2
(45) Date of Patent: Jul. 18, 2023

(54) HELICOIDAL BLADE MANUFACTURING SYSTEM AND METHOD

(71) Applicant: Horace Thompson, Okabena, MN (US)

(72) Inventor: Horace Thompson, Okabena, MN (US)

(*) Notice: Subject to any disclaimer, the term of this patent is extended or adjusted under 35 U.S.C. 154(b) by 250 days.

(21) Appl. No.: 16/942,382

(22) Filed: Jul. 29, 2020

(65) Prior Publication Data
US 2021/0086384 A1 Mar. 25, 2021

Related U.S. Application Data

(60) Provisional application No. 62/904,449, filed on Sep. 23, 2019.

(51) Int. Cl.
| | |
|---|---|
| *B21D 11/06* | (2006.01) |
| *B23K 31/10* | (2006.01) |
| *C21D 1/06* | (2006.01) |
| *C21D 9/00* | (2006.01) |
| *B26D 1/00* | (2006.01) |

(52) U.S. Cl.
CPC ......... *B21D 11/06* (2013.01); *B23K 31/10* (2013.01); *C21D 1/06* (2013.01); *C21D 9/0018* (2013.01); *B26D 2001/0073* (2013.01)

(58) Field of Classification Search
CPC ........ B21D 11/06; B21D 7/021; B21D 7/022; B21D 7/085; B21D 9/12; B21D 53/027; B21D 7/10; B21C 47/006; B21F 3/10
USPC ............................... 72/64, 65, 135, 139, 371
See application file for complete search history.

(56) References Cited

U.S. PATENT DOCUMENTS

| | | | | |
|---|---|---|---|---|
| 265,106 | A * | 9/1882 | Lee | B21F 3/04 72/139 |
| 2,762,419 | A * | 9/1956 | Prewitt | B21C 37/12 244/119 |
| 3,162,012 | A * | 12/1964 | Blaze | F02K 9/64 239/127.1 |
| 3,340,712 | A * | 9/1967 | Jameson | B21F 3/04 72/142 |

(Continued)

FOREIGN PATENT DOCUMENTS

| | | | | |
|---|---|---|---|---|
| DE | 4124326 C1 * | 4/1992 | | C21D 9/02 |
| GB | 2277283 A * | 10/1994 | | B21F 3/04 |

OTHER PUBLICATIONS

DE 2747844 A, Schmidt, Oct. 1977.*

*Primary Examiner* — Edward T Tolan
(74) *Attorney, Agent, or Firm* — Christopher A. Proskey; BrownWinick Law Firm

(57) ABSTRACT

A helicoidal blade system is presented having an armature to facilitate bending of metal stock to form helicoidal blades. In one or more embodiments, the armature has an exterior surface that is generally conical in shape and includes a guide structure and an engagement track. The helicoidal blade system also includes drive coupler and motor that are operably coupled together. The drive coupler is configured to engage the engagement track of the conical armature and rotate the conical armature when the motor is operated. A blade metal feed apparatus is configured to feed the metal stock into the helical shaped guide structure as the conical armature is rotated. As the conical armature is rotated, the metal stock is bent around the armature within the helical shaped guide structure to form one or more helicoidal blades.

24 Claims, 14 Drawing Sheets

(56) References Cited

U.S. PATENT DOCUMENTS

| | | | | |
|---|---|---|---|---|
| 3,864,952 | A | * | 2/1975 | Matsufuji ............... B21C 37/12 |
| | | | | 72/448 |
| 4,044,581 | A | * | 8/1977 | Meserole ............... B21D 49/00 |
| | | | | 72/370.19 |
| 4,048,826 | A | * | 9/1977 | Lechner ................. B21D 51/10 |
| | | | | 72/142 |
| 4,148,121 | A | * | 4/1979 | Butter .................... B21D 51/10 |
| | | | | 228/183 |
| 4,522,055 | A | * | 6/1985 | Berger .................... B21D 7/02 |
| | | | | 81/487 |
| 4,682,394 | A | * | 7/1987 | Wells ..................... B21F 33/04 |
| | | | | 72/138 |
| 4,821,390 | A | * | 4/1989 | Seyler ................... B21F 35/003 |
| | | | | 29/411 |
| 5,686,996 | A | * | 11/1997 | Fidler ................... G01J 1/4257 |
| | | | | 356/399 |

\* cited by examiner

HELICOIDAL BLADE MANUFACTURING SYSTEM AND METHOD

CROSS REFERENCE TO RELATED APPLICATIONS

This application also claims priority to U.S. Provisional Application No. 62/904,449 filed Sep. 23, 2019 and entitled HELICOIDAL BLADE MACHINING APPARATUS, the entirety of which is incorporated herein fully by reference.

FIELD OF THE DISCLOSURE

This disclosure relates to the manufacture of helicoidal shaped blades. More specifically and without limitation, this disclosure relates to a system for manufacturing helicoidal blades.

OVERVIEW OF THE DISCLOSURE

Helicoidal shapes have a wide applicability within various industries, including construction, agriculture, and machining; however, traditional manufacturing methods can result in a number of seams or joints, which can create fault points or areas of weakness within the helicoidal shape or blade. One such helicoidal shaped blade is more fully described in Applicant's related U.S. Pat. No. 10,147,464 entitled "Ground Contouring Apparatus," issued on Jan. 8, 2019, which is fully incorporated herein, including any related applications.

In these related patent applications, a helicoidal shaped blade is utilized to provide improved ground contouring of particulate matter. While this helicoidal shape is effective, problems and challenges remain with the manufacture or machining of the helicoidal shape.

Thus, it is a primary object of the disclosure to provide a system for manufacturing a helicoidal shaped blade or other helicoidal shaped implement.

Another object of the disclosure is to provide a system for manufacturing a helicoidal shaped blade that reduces cost over existing systems.

Yet another object of the disclosure is to provide a system for manufacturing a helicoidal shaped blade that facilitates the bending or forming of a multitude of helicoidal shaped blades simultaneously.

Yet another object of the disclosure is to provide a system for manufacturing a helicoidal shaped blade that reduces the complexity of the manufacturing process.

Another object of the disclosure is to provide a system for manufacturing a helicoidal shaped blade that reduces the amount of time required to manufacture.

Yet another object of the disclosure is to provide a system for manufacturing a helicoidal shaped blade that reduces the amount of machine time required to manufacture the product.

These and other objects, features, or advantages of the present disclosure will become apparent from the specification, claims and drawings.

SUMMARY OF THE DISCLOSURE

A helicoidal blade system is presented having an armature that extends a length from a first end to a second end. In one or more embodiments, the armature has an exterior surface that is generally conical in shape. The exterior surface of the conical armature includes a guide structure and includes an engagement track. The helicoidal blade system also includes drive coupler and motor that are operably coupled together. The drive coupler is configured to engage the engagement track of the conical armature. When the motor operates, the drive coupler rotates, which causes the conical armature to be rotated. A blade metal feed apparatus is configured to provide metal stock to be formed into helicoidal blades. The blade metal feed apparatus is positioned and aligned to feed the metal stock into the helical shaped guide structure as the conical armature is rotated. As the conical armature is rotated, the metal stock is bent around the armature within the helical shaped guide structure to form one or more helicoidal blades.

DETAILED DESCRIPTION OF THE DISCLOSURE

Figure 1:
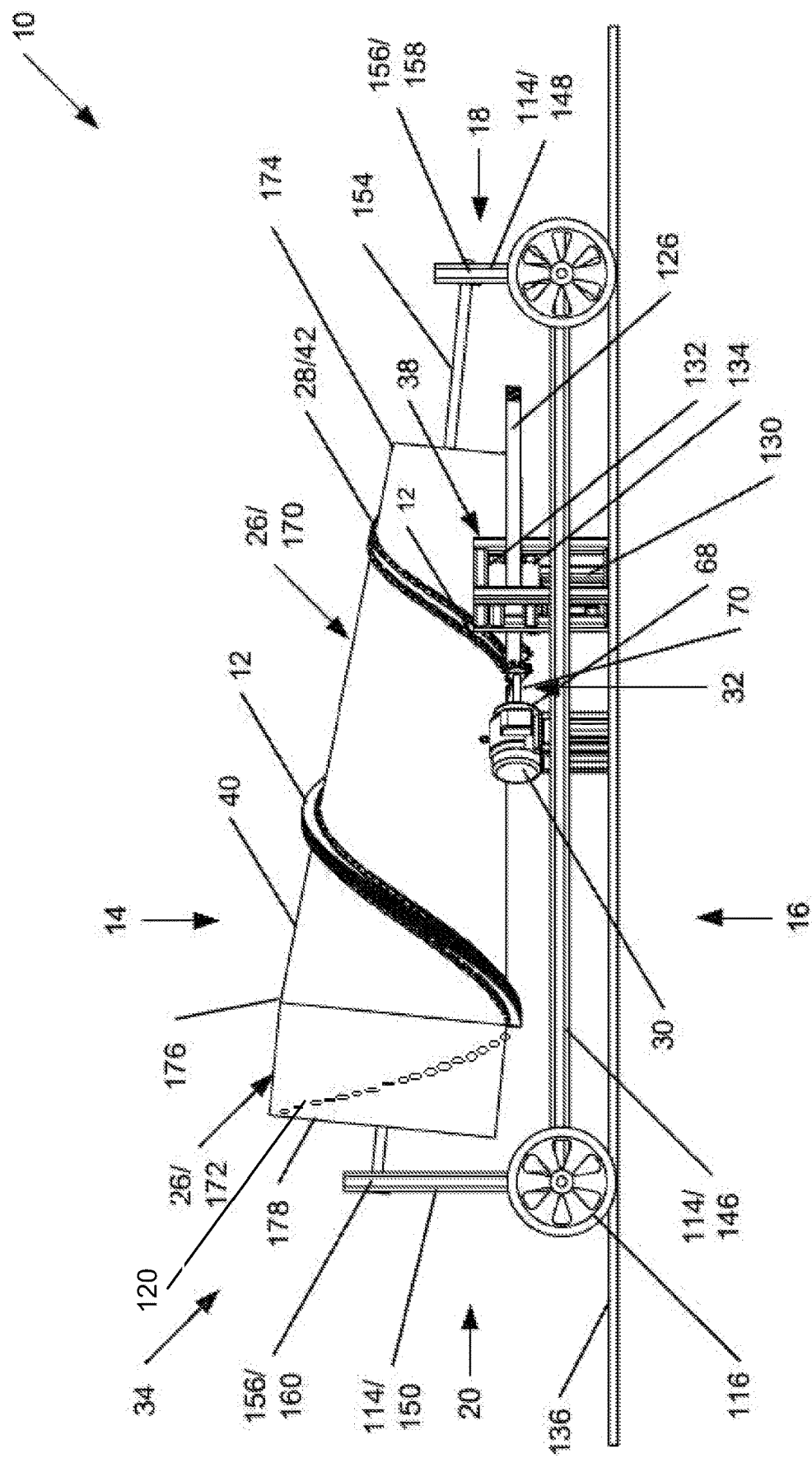
FIG. 1 shows a right side view of a helicoidal blade manufacturing system, in accordance with one or more embodiments of the present disclosure.
Figure 2:
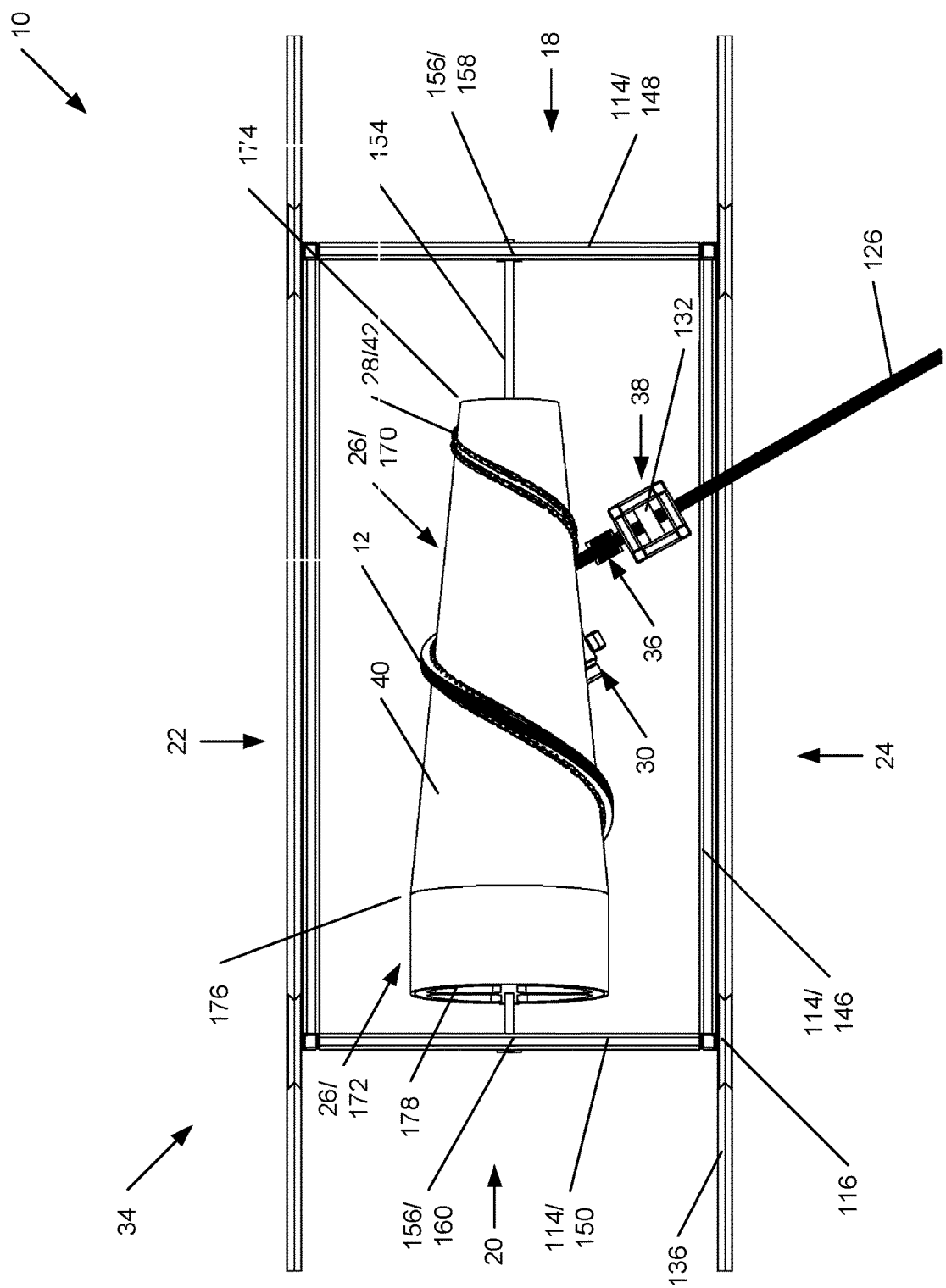
FIG. 2 shows a top side view of a helicoidal blade manufacturing system, in accordance with one or more embodiments of the present disclosure.
Figure 3:
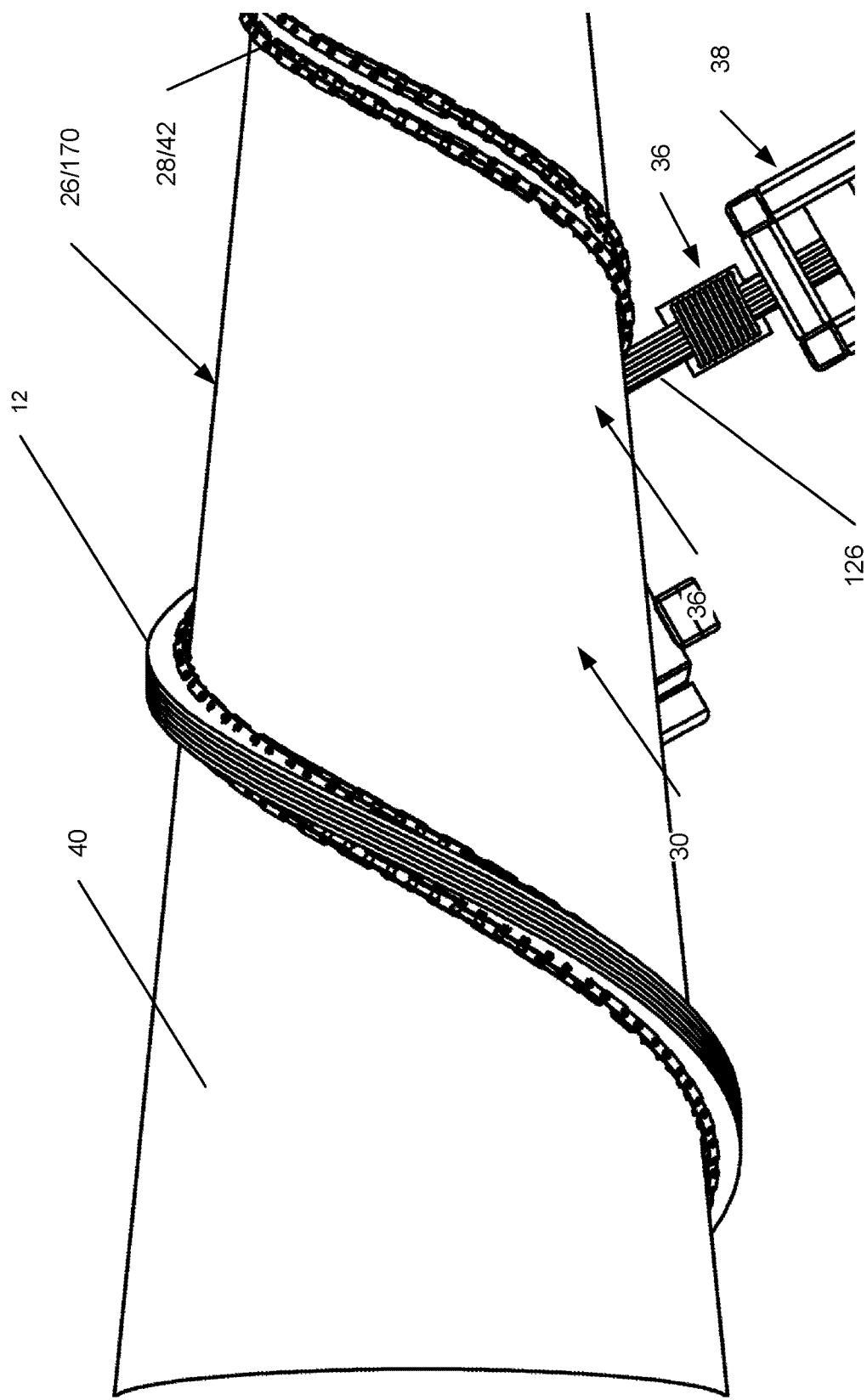
FIG. 3 shows a close up of the view shown in FIG. 2, in accordance with one or more embodiments of the present disclosure; the view showing blade metal stock for multiple helicoidal blades being feed into a helical shaped guide structure.
Figure 4:
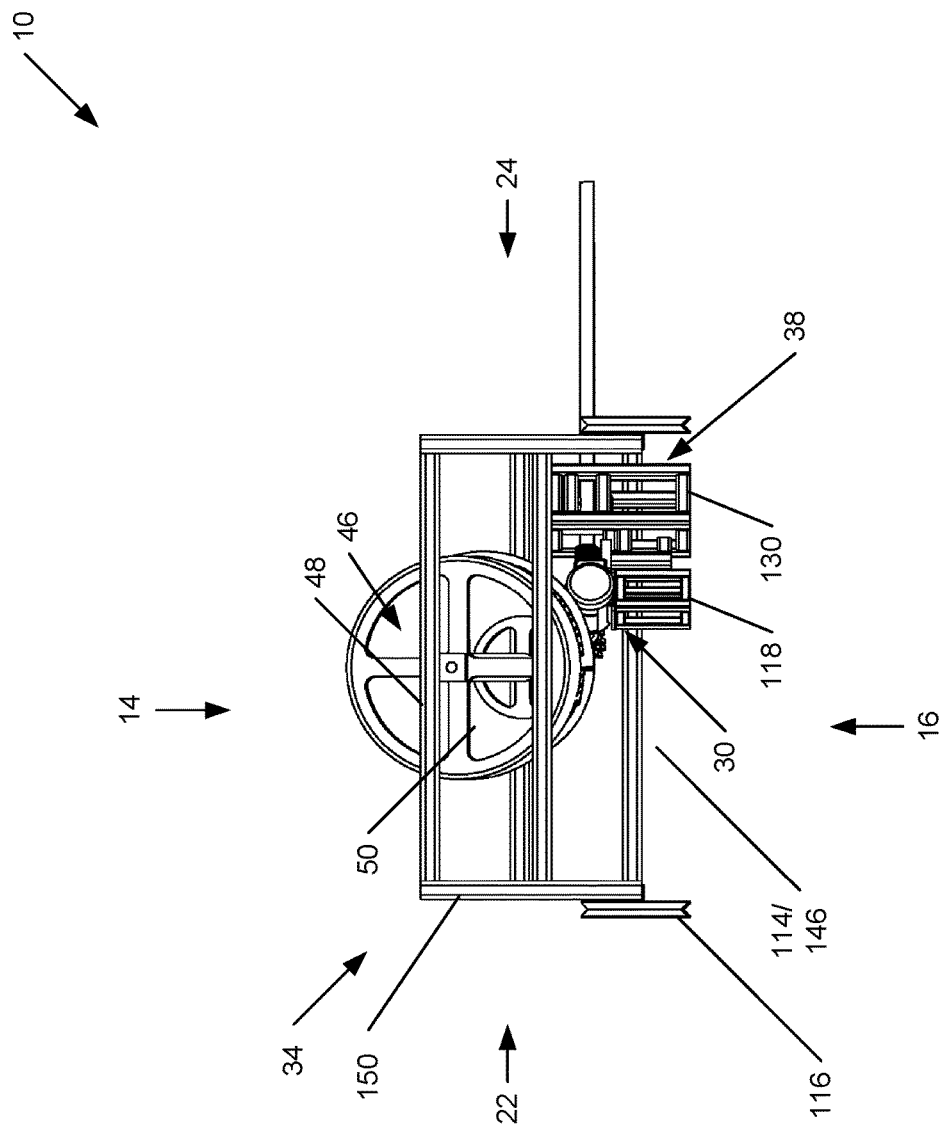
FIG. 4 shows a back side view of a helicoidal blade manufacturing system, in accordance with one or more embodiments of the present disclosure.
Figure 5:
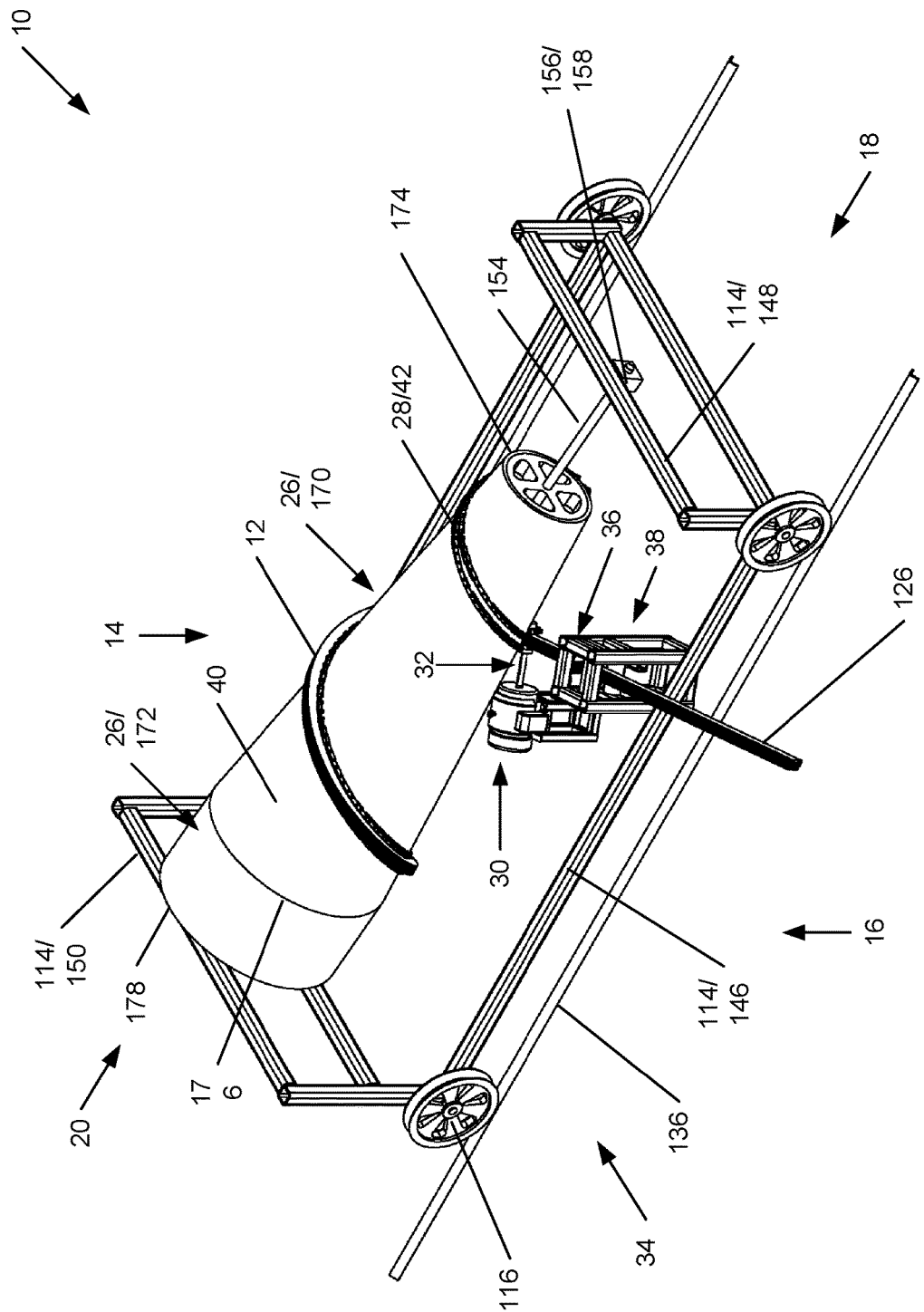
FIG. 5 shows a front right perspective view of a helicoidal blade manufacturing system, in accordance with one or more embodiments of the present disclosure.
Figure 6:
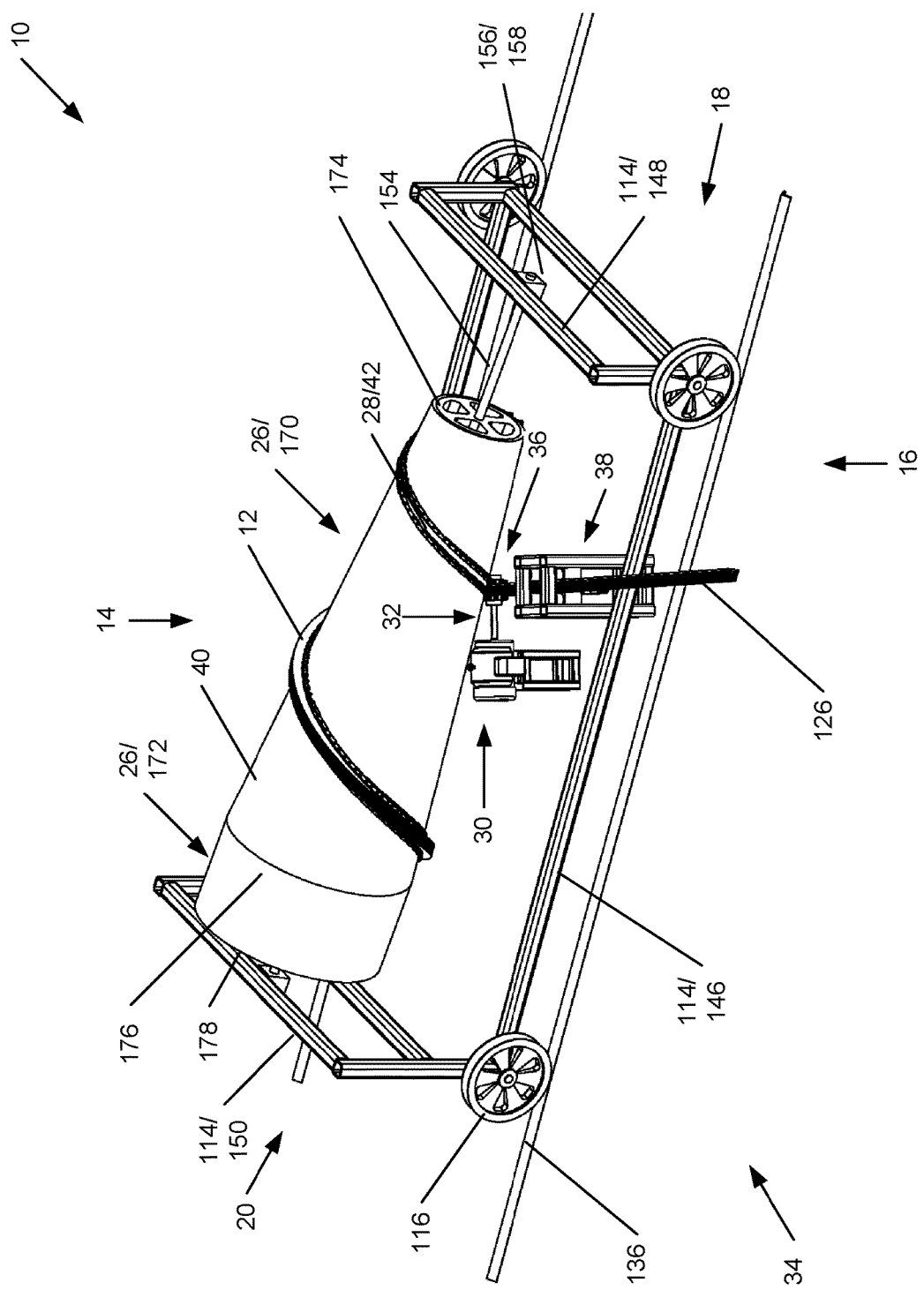
FIG. 6 shows a right front perspective view of a helicoidal blade manufacturing system, in accordance with one or more embodiments of the present disclosure.
Figure 7:
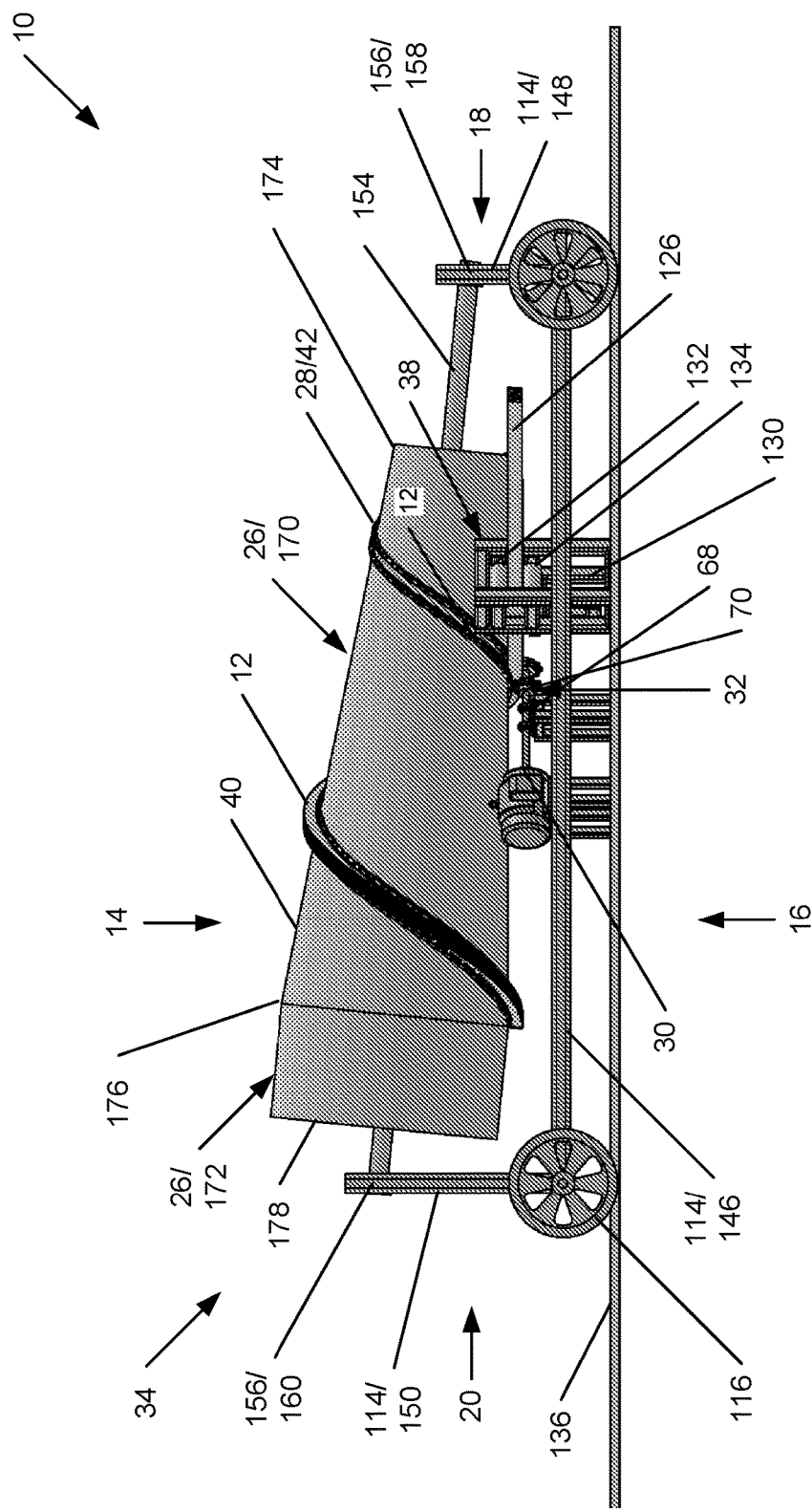
FIG. 7 shows a shaded right side view of a helicoidal blade manufacturing system, in accordance with one or more embodiments of the present disclosure.
Figure 8:
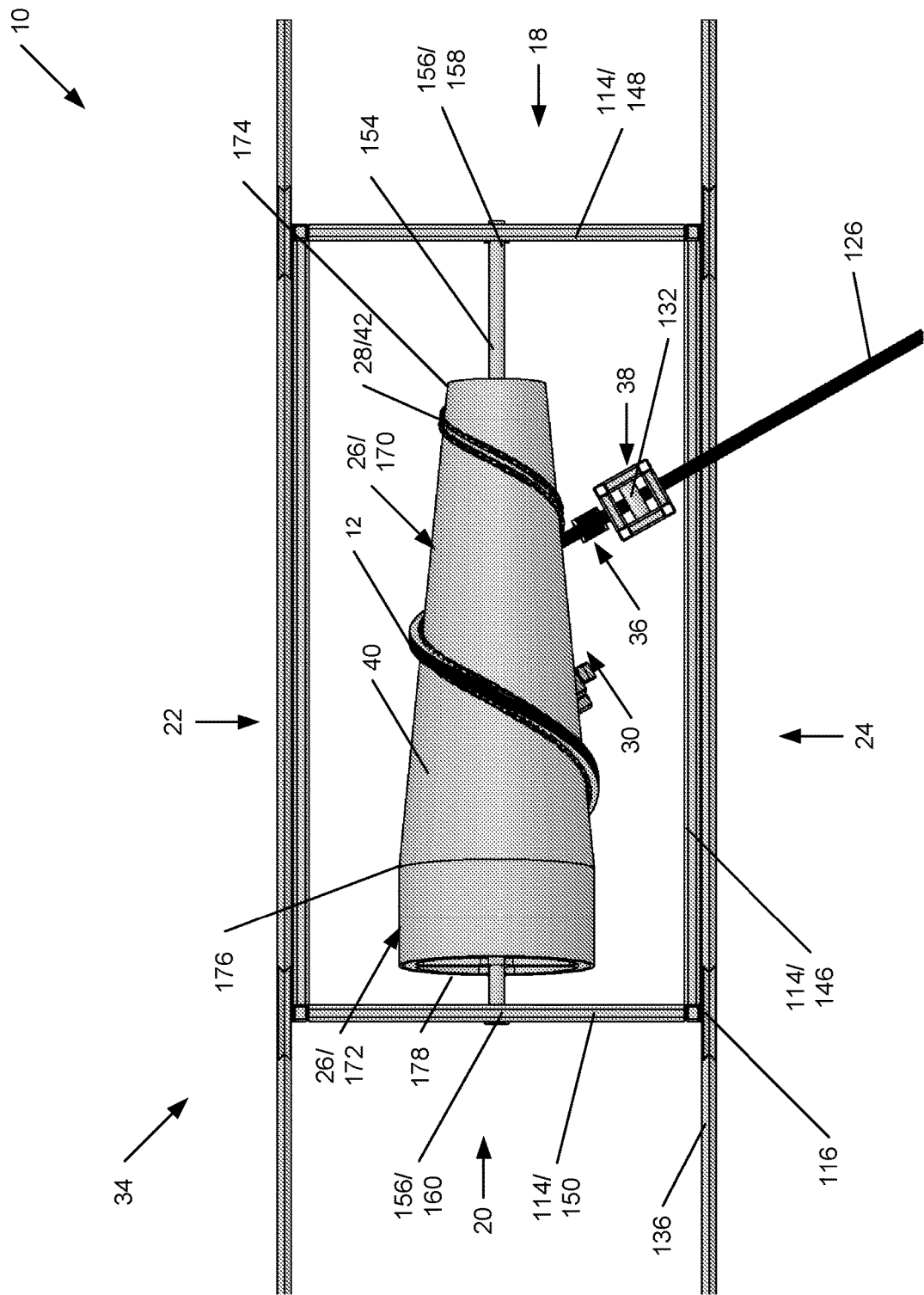
FIG. 8 shows a shaded top side view of a helicoidal blade manufacturing system, in accordance with one or more embodiments of the present disclosure.
Figure 9:
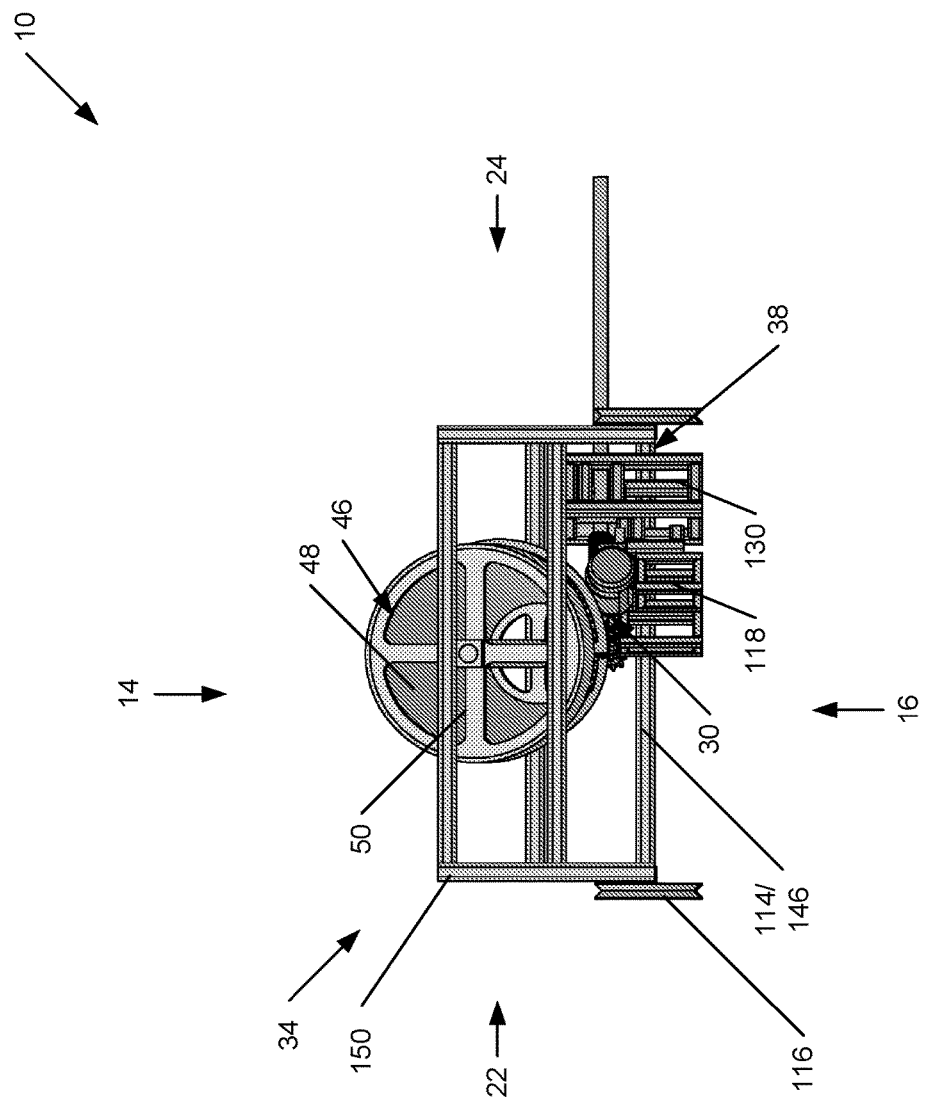
FIG. 9 shows a shaded back side view of a helicoidal blade manufacturing system, in accordance with one or more embodiments of the present disclosure.
Figure 10:
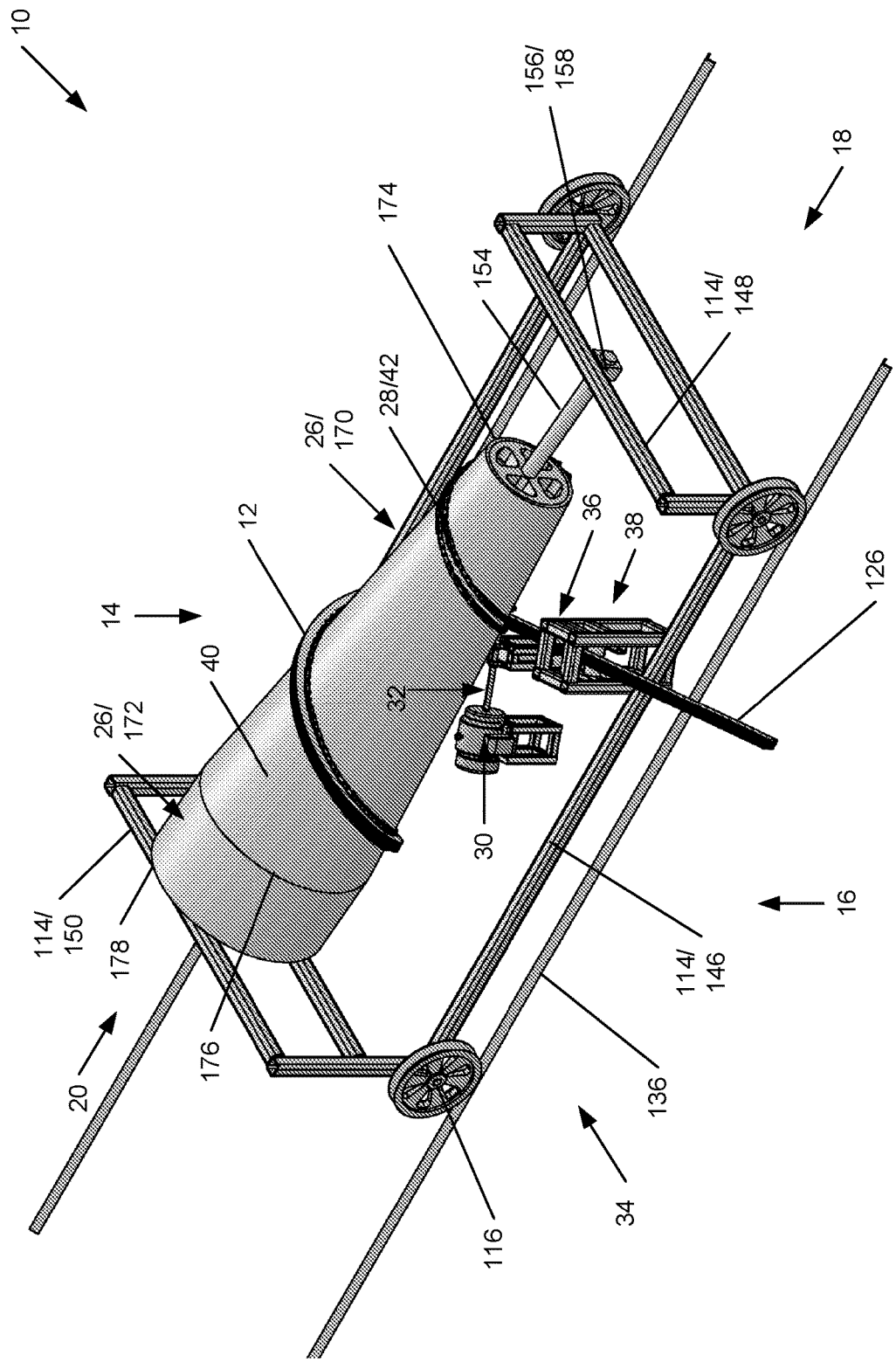
FIG. 10 shows a shaded front right perspective view of a helicoidal blade manufacturing system, in accordance with one or more embodiments of the present disclosure.
Figure 11:
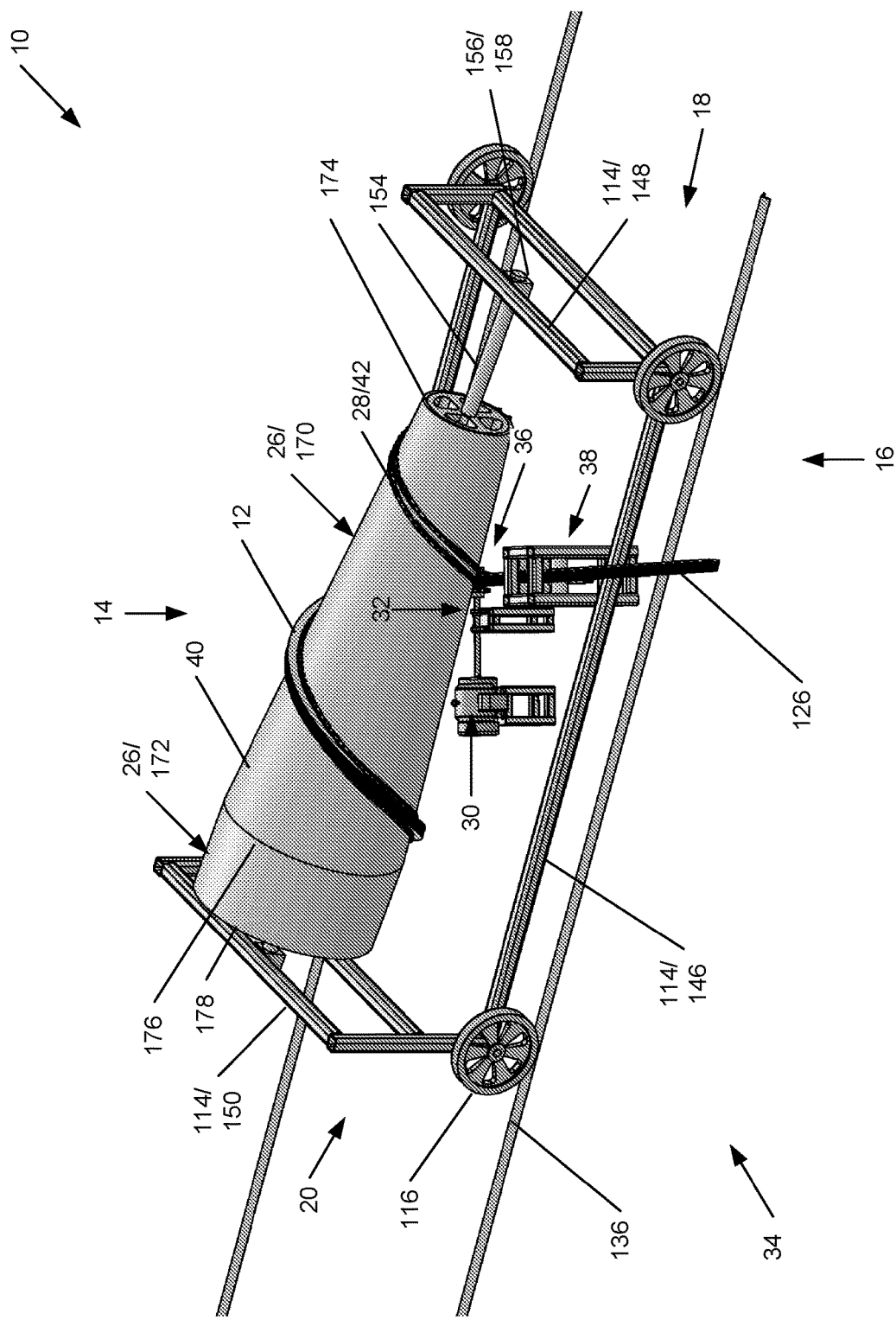
FIG. 11 shows a shaded right front perspective view of a helicoidal blade manufacturing system, in accordance with one or more embodiments of the present disclosure.
Figure 12:
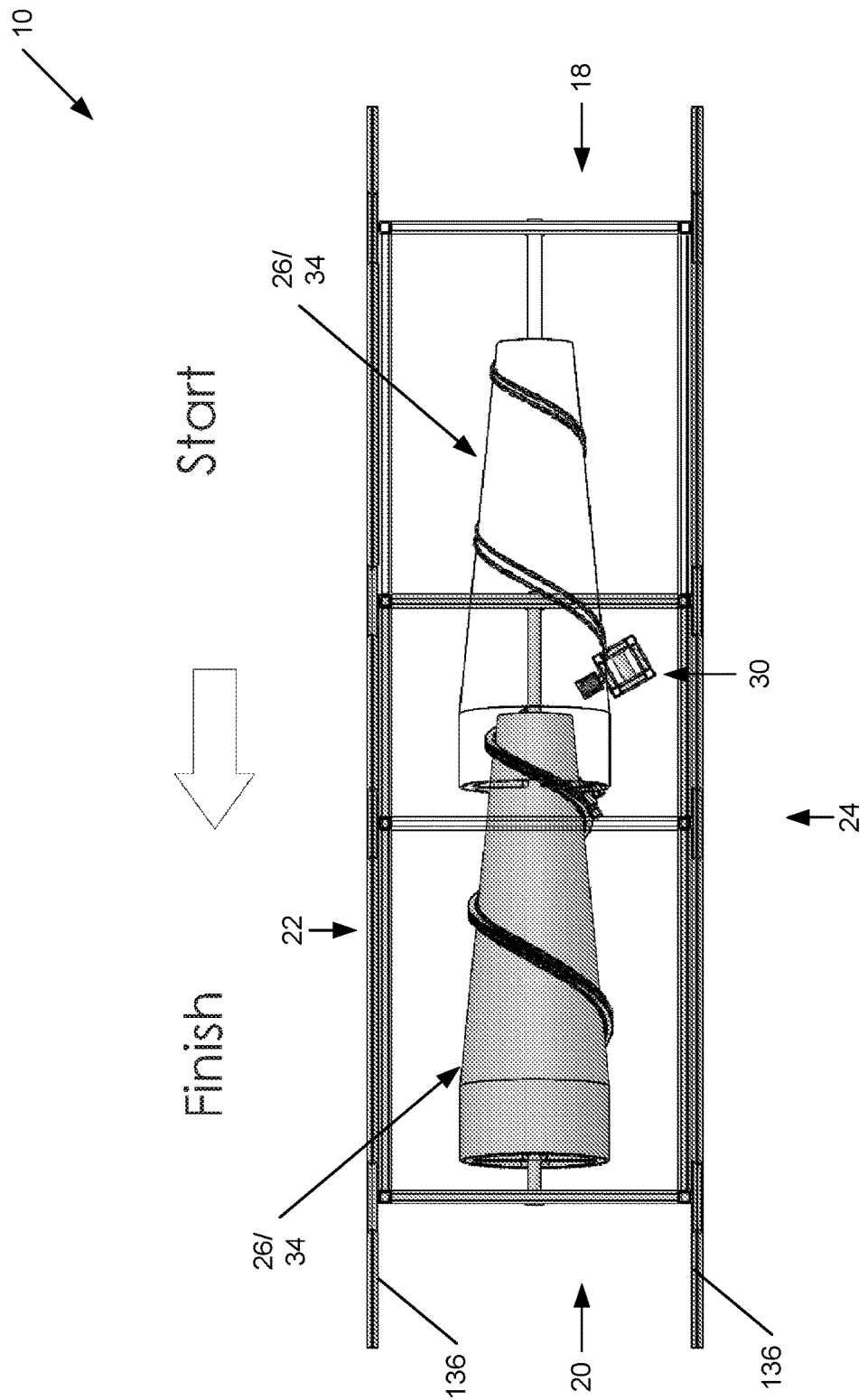
FIG. 12 shows a top side view of a helicoidal blade manufacturing system, in accordance with one or more embodiments of the present disclosure; the view illustrating the system at a starting position as a line drawing and illustrating the system in a finished position as a shaded drawing.
Figure 13:
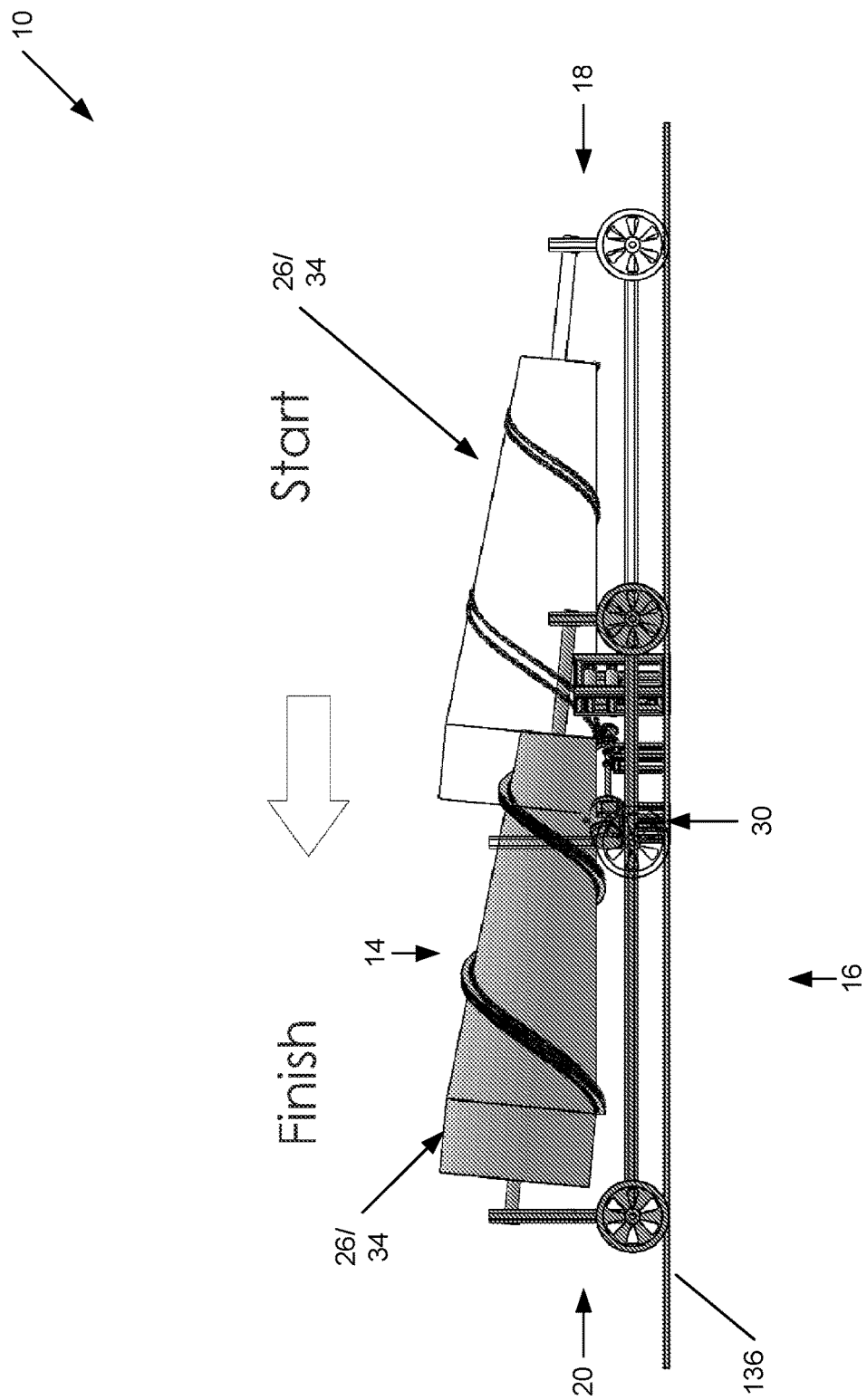
FIG. 13 shows a side view of a helicoidal blade manufacturing system, in accordance with one or more embodiments of the present disclosure; the view illustrating the system at a starting position as a line drawing and illustrating the system in a finished position as a shaded drawing.
Figure 14:
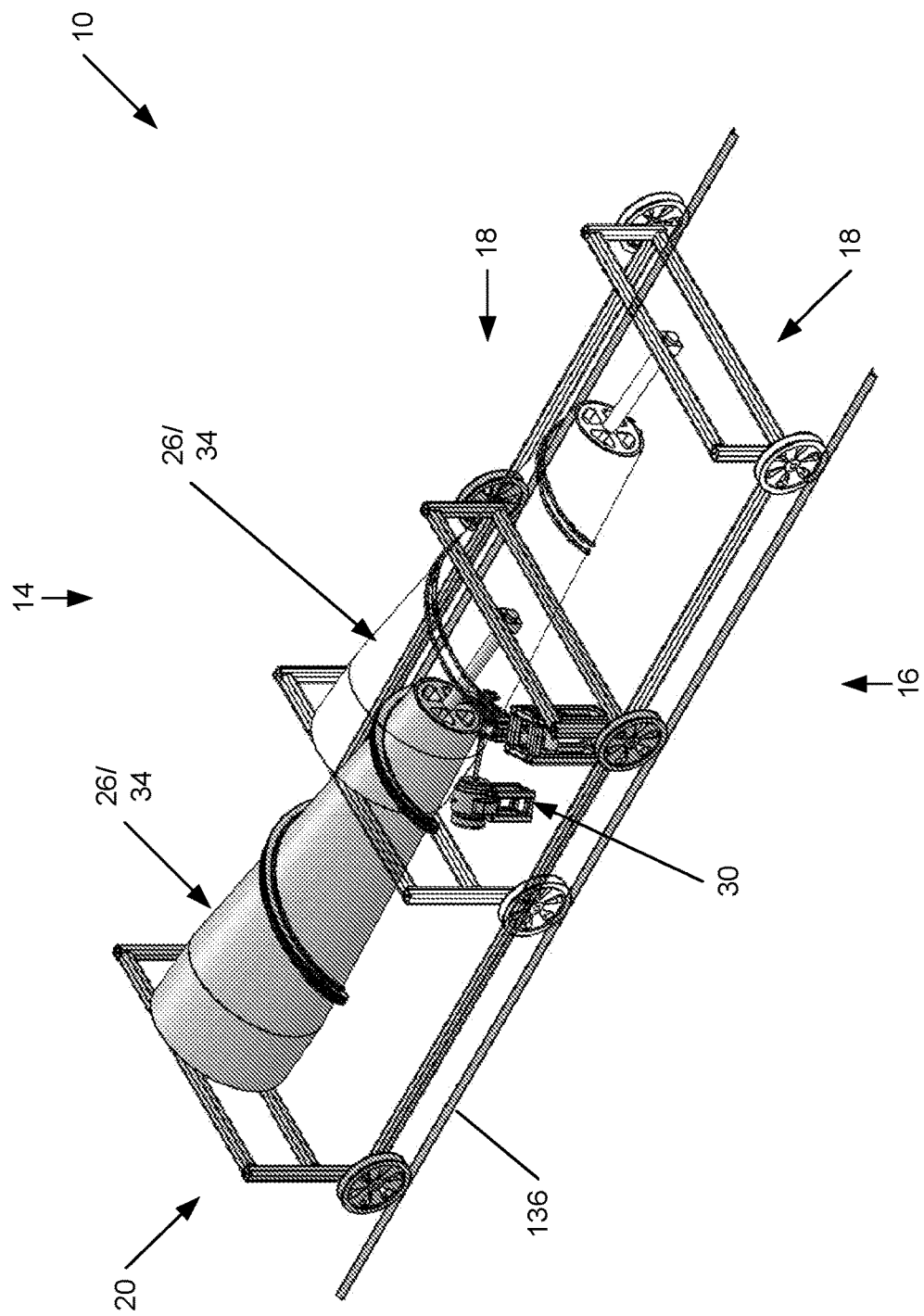
FIG. 14 shows a front right perspective view of a helicoidal blade manufacturing system, in accordance with one or more embodiments of the present disclosure; the view illustrating the system at a starting position as a line drawing and illustrating the system in a finished position as a shaded drawing.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of manufacturing conical helicoidal shaped blades. However, the embodiments are not so limited. It is appreciated that the embodiments may be adapted for manufacture of helical shaped structures other than blades and/or having various helical shapes (e.g., general helix, circular helix, conical helix, conical logarithmic helix, and/or any other helical shape). It is also appreciated that the embodiments may be adapted use in other applications, which may be improved by the disclosed structures, arrangements and/or methods. The system is merely shown and described as being used in in the context of conical helicoidal shaped blades for ease of description and as one of countless examples.

System 10:

With reference to the figures, a helicoidal blade manufacturing system 10 (system 10) is presented. System 10 is formed of any suitable size, shape and design and is configured to facilitate the machining of a helicoidal blade 12 in a quick, easy, safe, and smooth manner. In the arrangement shown, as one example, the machining system 10 has a top side 14, a bottom side 16, a front side 18, a back side 20, a left side 22 and a right side 24. In the arrangement shown, as one example, the system 10 includes the following component pieces: a conical armature 26, drive motor 30, drive assembly 32, furnace 36, and blade metal feed 38, among others.

Conical Armature 26:

In one or more arrangements, system 10 includes a conical armature 26. Conical armature 26 is formed of any suitable size, shape and design and is configured to support the formation of the helicoidal blade 12. In the arrangement shown, as one example, conical armature 26, is formed of an elongated conical member that extends a length between opposing ends 174 and 178. Conical armature 26 may be formed of a single, unitary member or may be formed of a plurality of connected members that form a conical armature 26.

In the arrangement shown, as one example, when viewed from an end, conical armature 26 includes a front portion 170 having a generally conical shape with an exterior surface 40 extending from a front end 174 to a rear end 176. In this example arrangement, conical armature 26 also includes a rear portion 172 having a generally cylindrical shape along the exterior surface of conical armature 26 from rear end 176 of front portion 170 to a rear end 178 of conical armature 26. In the arrangement shown, as one example, exterior surface 40 of front portion 170 generally conical in shape and has a smooth surface that includes guide structure 42.

Guide structure 42 is formed of any suitable size, shape and design and is configured to facilitate the formation of the helicoidal blade 12. In one arrangement, as is shown, guide structure 42 is formed of a helicoidal guide structure positioned in exterior surface 40. The guide structure 42 can be a left-hand guide structure, a right-hand guide structure, or both, or a plurality or combination of left-hand guide structures and/or right-hand guide structures. Guide structure 42 may include but are not limited to grooves, channels, indentations, leads, protrusions, threads or any other feature or the like, as is described herein. Guide structure 42 can either be weld-assembled or machined into the surface of conical armature 26, knurled into the surface of the conical armature 26, cast into the surface of the conical armature 26, formed into the surface of the conical armature 26, extruded into the exterior surface of conical armature 26, or created by any other means or methods known in the art.

In the arrangement shown, guide structure 42 is a channel between two protrusions extending outward from exterior surface 40 of conical armature 26. The channel extends along a helical path between ends of conical armature 26. In this example arrangement, the channel is configured to received and hold six blade metal stocks 126 side by side for concurrent formation of a multiple blades. However, embodiments are not so limited. Rather, it is contemplated that guide structure 42 may be configured to hold one, two, three, four, five, six, seven, or any other number of blade metal stocks 126. Furthermore, it is also contemplated that conical armature 26 may include any number of guide structures 42 that are spaced (evenly or unevenly) across the exterior surface 40 of conical armature 26 and they rotate in a consistent manner across the length of front portion 170 of conical armature 26 from end 174 to end 176. It is also contemplated that guide structures 42 may be formed of all left hand guide structures, right hand guide structures or a combination of both which may be spaced from one another at any spacing. In the arrangement shown, the guide structure 42 has a consistent angle of rotation throughout the length of the guide structure 42 along front portion 170 of conical armature 26, and maintaining the position along a helical path within close tolerances throughout the length of the conical armature 26. In one or more alternative arrangements, the grooves of guide structure 42 have varying pitch or angle of rotation along the length of conical armature 26.

In one or more embodiments, the conical armature 26 further comprises a starter chain 120. The starter chain 120 has one end which is, in one embodiment, affixed to one end of the conical armature 26, with the opposite end of the starter chain 120 being connectable to blade metal stock 126. In a further embodiment, one end of the starter chain 120 is affixed to the guide structure 42, with the opposite end of the starter chain 120 being connectable to blade metal stock 126. When conical armature 26 is rotated, the starter chain pull blade metal stock 126 into guide structure 42 and facilitates formation of helicoidal blades 12. The starter chain may be made of any suitable material and of any suitable dimension.

In one or more embodiments, conical armature 26 includes an exterior surface 40. The exterior surface 40 is formed of any suitable size, shape and design and is configured to reduce the amount of material needed to form a conical armature 26. In the arrangement shown, as one example, the exterior surface 40 is generally smooth and cylindrical in shape.

In one or more embodiments, conical armature 26 includes a hollow interior 46. Hollow interior 46 is formed of any suitable size, shape and design and is configured to reduce the amount of material needed to form a conical armature 26. In the arrangement shown, as one example, hollow interior 46 includes an interior surface 48 which is generally smooth and cylindrical in shape and is positioned in approximate parallel spaced alignment to exterior surface 40. With that said, due to the wall thickness of conical armature 26 the diameter of the interior surface 48 is less than the diameter of exterior surface 40.

In the arrangement shown, as one example, hollow interior 46 includes at least one interior feature 50 that protrude inward from the interior surface 48 which may be used to facilitate rotation of the conical armature 26. In the arrangement shown, as one example, the interior feature 50 shown extends the length of the conical armature 26 from end 174 to end 178.

Motor 30:

Motor 30 is formed of any suitable size, shape and design and is configured to generate mechanical movement. In the arrangement shown, as one example, motor 30 is an electric motor (e.g., a DC motor or an AC motor) configured to convert electric power into rotational motion. However, embodiments are not so limited. For example, in some arrangements, motor 30 may be an internal combustion engine, a fluid driven engine (e.g., steam, water, and/or air driven), or any other type of motor or engine. In the arrangement shown, motor 30 is attached to a floor support structure 118 which is connected to the floor.

Drive Assembly 32:

Drive assembly is formed of any suitable size, shape, and design and is configured to transfer rotational movement from motor 30 to conical armature 26 to facilitate rotation of conical armature 26. In the arrangement shown, as one example, drive assembly includes a drive coupler 68, a drive shaft 70, and an engagement track 28.

Drive Shaft 70:

Drive shaft 70 is formed of any suitable size, shape and design and is configured to transfer rotational energy from motor 30 to drive coupler 68. In the arrangement shown, as one example, drive shaft 70 is an elongated cylindrical shaft extending between opposing ends. In this example arrangement, one end of drive shaft 70 is operably connected to an output shaft of motor 30 and the other end of drive shaft 70 is operably connected to a drive coupler 68. In various arrangements, drive shaft 70 may be connected to the output shaft of motor 30 and to drive coupler 68 by various connection mechanisms including, for example, welding, stapling, crimping, riveting, screwing, bolting, snap-fitting, friction fitting or any other mechanical process.

Drive Coupler 68 and Engagement Track 28:

Drive coupler 68 is formed of any suitable size, shape and design and is configured to engage with engagement track 28 of the conical armature 26 and facilitate rotation of conical armature 26 as drive coupler 68 is rotated. Likewise, engagement track 28 is formed of any suitable size, shape and design and is configured to engage drive coupler 68 and facilitate rotation of conical armature 26 as drive coupler 68 is rotated.

In the arrangement shown, as one example, drive coupler 68 is a gear configured to engage with an engagement track 28 formed on exterior surface 40 of conical armature 26. In this example arrangement, engagement track 28 is a chain attached to exterior surface 40. When drive coupler 68 is rotated during operation, teeth of drive coupler 68 gear engage links of the engagement track 28 chain to cause conical armature 26 to rotate. However, embodiments are not so limited. For example, alternatively, in one or more arrangements, engagement track 28 may have teeth configured to engage teeth of drive coupler 68.

In the arrangement shown, as one example, engagement track 28 also forms guide structure 42 of conical armature 26. In this example arrangement, as drive coupler 68 rotates, teeth of drive coupler 68 engage and move along the helical path of engagement track 28 which causes conical armature 26 to rotate and move rearward. However, embodiments are not so limited. Rather, it is contemplated that drive assembly 32 may engage various portions of conical armature to facilitate rotation including but not limited to for example, exterior surface 40 of conical armature 26, interior surface 48 of conical armature 26, and/or axle 154 operably connected to conical armature 26.

In some various arrangements, drive assembly 32 may include various additionally or alternatively components to facilitate operative connection between the output shaft of motor 30 and conical armature 26. For instance, in one or more arrangements, drive assembly 32 may include a gearbox 124 configured to changes rotational speed of a drive shaft 70 of motor 30 relative to drive coupler 68 adjust speed and/or torque via an arrangement of gears or other components.

Alternative Arrangement of Drive Assembly 32:

In an alternative arrangement, as one example, a drive coupler 68 of drive assembly 32 is used to connect to the exterior surface of conical armature 26. In this alternative arrangement, drive coupler 68 includes a main body 84 (not shown), a plurality of connection members 86 (not shown) and a drive lug 88 (not shown), among other features, components and structure.

Main body 84 is formed of any suitable size, shape and design and is configured to facilitate connection between the drive lug 88 and output shaft 90 (not shown) of gearbox 124 on one side and connection members 86 on the other side so as to facilitate connection to the exterior surface of conical armature 26. In this alternative arrangement, as one example, main body 84 is formed of a generally cylindrical member having an exterior surface 92 (not shown) that is generally smooth and cylindrical or circular in shape when viewed from an end. In this alternative arrangement, as one example, main body 84 extends a length from an outward end 94 (not shown) to an inward end 96 (not shown). In the arrangement shown, as one example, outward end 94 and inward end 96 extend in approximate planar spaced relation to one another and extend in approximate perpendicular alignment to the end-to-end length of main body 84.

In this alternative arrangement, as one example, an opening 98 (not shown) is positioned in the outward end 94 of main body 84 of drive coupler 68. This opening 98 is sized and shaped to receive drive lug 100 (not shown) therein. Drive lug 88 is formed of any suitable size, shape and design and is configured to connect to the output shaft 90 of gearbox 124 to the engagement track 28. As one example, drive lug 88 has a generally gear-teeth shaped exterior peripheral edge 102 (not shown) that connects to a generally cylindrical shaped end wall 104 (not shown) at its outward most edge.

As one example, opening 98 in the outward end 94 of main body 84 of drive coupler 68 is sized and shaped to receive drive lug 100 therein within close and tight tolerances. In one implementation, to help ensure drive lug 100 remain in main body 84, opening 98 is sized and shaped to apply a friction fit on drive lug 100 when it is in place within opening 98. In another implementation, an adhesive is used to bind drive lug 100 when it is in place within opening 72. In another implementation, a mechanical arrangement is utilized that affixes drive lug 100 when it is in place within opening 98, which may be stapling, crimping, riveting, screwing, bolting, snap-fitting, friction fitting or any other mechanical process. Any combination of these arrangements may be used to connect and hold drive lug 100 when it is in place within opening 98, as well as any other method or means of connecting two components together. The shape of drive lug 100 and the manner in which it is in connection to engagement track 28 helps to ensure that conical armature 26 rotates when drive lug 100 rotates.

In this alternative arrangement, as one example, drive lug 100 includes an opening 98 at its middle that is sized and shaped to receive an output shaft 90 of gearbox 124. In the arrangement shown, as one example, opening 98 is non-round in nature so as to facilitate transmission of rotation of output shaft 90 to drive lug 100, which transmits this rotation to main body 84. In this alternative arrangement, as one example, opening 194 is circular in shape with a flat section, which corresponds in size and shape to output shaft 90.

In this alternative arrangement, as one example, the inward end 96 of main body 84 includes an opening 98 which is sized and shaped to receive a clip 106 (not shown) that is configured to be attached to the inward most end of output shaft 90 after it is inserted into opening 98 of drive lug 100 and through a portion of the material of main body 84. The use of clip 106 ensures that output shaft 90 does not come unintentionally dislodged from drive coupler 68. Clip 106 may be a one-way pressure clip, a screw, a bolt, a pin, a nut or any other member that connects two components together.

Furnace 36:

System 10 includes a furnace 36. Furnace 36 is formed of any suitable size, shape and design, such as combustible gas or electrical induction, and is generally configured to facilitate the shaping of helicoidal blade 12 around conical armature 26. In the arrangement shown, as one example, furnace 36 receives the blade metal feed 38 and outputs heated metal which is then fed into the guide structure 42 on exterior surface 40 of the conical armature 26, resulting in helicoidal blade 12 or blades. Furnace 36 may be heated to any suitable temperature and as one of skill in the art shall appreciate, the temperature required for shaping of helicoidal blades 12 will depend on the material of construction's forging temperature. In the arrangement shown, furnace 36 is attached to a floor support structure 118 which is connected to the floor.

In some arrangement furnace 36 may be additionally be configured to perform a metallurgy treatment processes to the blade metal stock 126 as it is passed through furnace 36. Such processes may include but are not limited to, for example, heat treatments, surface hardening or carbonization (e.g., using carbon monoxide, carbon dioxide, methane, or propane, and/or other carbon bearing gas) decarburization, chemical treatments, and/or any metal treatments.

Blade Metal Feed 38:

Blade metal feed 38 is formed of any suitable size, shape and design, and is configured to receive hold and align blade metal stock 126 to facilitate proper engagement with conical armature 26 and guide structures 42 and facilitate bending of blade metal stock 126. In the arrangement shown, blade metal feed 38 includes a frame 130, a top roller 132, and a bottom roller 134. In this example arrangement, frame 130 is a generally cube shaped frame configured for attachment to a floor. In this example arrangement, top roller 132 and bottom roller 134 are attached to frame 130 with rollers 132 and 134 extending in a parallel horizontal alignment perpendicular to a path of blade metal stock 126. In this example arrangement, top roller 132 and bottom roller 134 are spaced apart from each other by a height configured to permit blade metal stock 126 to pass between top roller 132 and bottom roller 134 with tight tolerances. In the arrangement shown, blade metal feed 38 is configured to receive and hold a plurality of side by side blade metal stocks to facilitate concurrent formation of multiple helical blades at the same time.

Mobile Support System 34:

In the arrangement shown, the conical armature 26 is mounted on a mobile support system 34. Mobile support system 34 is formed of any suitable size, shape, and design and is configured to facilitate rotation of conical armature 26 and forward and backward movement of conical armature 26 during operation. In the arrangement shown mobile support system 34, includes a frame 114, a connection assembly 122, wheels 116, and rails 136.

Frame 114: Frame 114 is formed of any suitable size, shape, and design and is configured to facilitate interconnection of components of system to support conical armature 26 and facilitate operation. In the arrangement shown, as one example, frame 114 had a base 146, a front vertical support 148, and a rear vertical support 150. In this example arrangement, frame 114 has a generally rectangular base 146 extending from front side 18 of system 10 to back side 20 of system 10 and from left side 22 of system 10 to right side 24 of system 10. In this example arrangement, front vertical support 148 extends upward from base 146 at front side 18 of system 10. In this example arrangement, rear vertical support 150 extends upward from base 146 at back side 20 of system 10.

Wheels 116 and Rails 136: In this example arrangement, wheels 116 and rails 136 are formed of any suitable size, shape, and design and are configured to facilitate movement of mobile support system 34 on rails 136. In the arrangement shown four wheels 116 are connected to frame 114 with wheel 116 positioned to engage and ride on a pair of parallel rails 136 positioned on a floor. In this example arrangement, the wheels 116 and rails 136 facilitate smooth back and forth movement of mobile support system 34 with little resistance. In this example arrangement, the wheels 116 and rails 136 also prevent slipping or misalignment of mobile support system 34 during operation.

In this example arrangement, conical armature 26 is attached to frame 114 of mobile support system 34 by connection assembly 122. Connection assembly 122 is formed of any suitable size, shape, and design and is configured to support and facilitate rotation of conical armature 26. In the arrangement shown, connection assembly includes an axle 154 connected to conical armature 26 and rotatable connectors 156.

Axle 154 is formed of any suitable size, shape, and design and is configured to facilitate suspension of conical armature 26 between front vertical support 148 and rear vertical support 150 of frame 130 and facilitate rotation of conical armature 26. In the arrangement shown, as one example, axle 154 has an elongated cylindrical shape extending between a forward end 158 and a rearward end 160. In this example arrangement, axle 154 is connected to conical armature 26 by interior features 50 extending inward from interior surface 48 of conical armature to a center point.

Rotatable Connectors 156 are formed of any suitable size, shape, and design and is configured to facilitate attachment of forward end 158 of axle 154 to front vertical support 148 and rearward end 160 of axle 154 to rear vertical support 150 while permitting axle 154 to be rotated. In one or more arrangements, rotatable connectors 156 may include, for example, bearing assembly to facilitate smoot rotational movement of axle 154 and conical armature 26. In the arrangement shown, rotatable connectors 156 attach to front vertical support 148 at a lower height than rear vertical support 150 to hold conical armature 26 at an angle. In this example arrangement, conical armature 26 is held at an angle at which a bottom surface of conical armature 26 is approximately horizontal.

In Operation:

As an illustrative example, mobile support system 34 is positioned and so drive coupler 68 of drive assembly 32 is aligned with and engages engagement track 28 at a rear end of conical armature 26. In one or more arrangements, drive coupler 68 may be removed from drive shaft 70, to facilitate repositioning of mobile support system 34

Once mobile support system 34 and conical armature 26 are in position the drive coupler 68 is installed on the end of drive shaft 70 in close proximity to the exterior surface of the conical armature 26. As the drive coupler 68 is installed, close and tight tolerances between the exterior diameter of the conical armature 26 and the exterior diameter of the drive coupler 68 exist. In one arrangement, as one example, when drive coupler 68 is installed in close proximity to the exterior surface of the conical armature 26, the drive coupler 68 is in frictional engagement with the exterior surface of the conical armature 26 (e.g., so teeth of drive coupler 68 engages with links/teeth of engagement track 28).

With the arrangement shown in this position guide structure 42 is aligned to receive blade metal stock 126 from blade metal feed 38. Blade metal stock 126 for one or more blades is fed through blade metal feed 38 and furnace 36 until a starting end of the blade metal stock 126 is inserted in guide structure 42.

In one or more arrangements, starter chain 120 is connected to the starting end of blade metal stock 126. When conical armature 26 is rotated, the starter chain pull blade metal stock 126 into guide structure 42 and facilitates formation of helicoidal blades 12. The starter chain 120 also holds the starting end of blade metal stock 126 in the guide structure to conical armature 26 is rotated to facilitate bending of the blade metal stock 126 around armature.

However, embodiments are not so limited. Rather, it is contemplated that the starting end of blade metal stock 126 may be connected to exterior surface 40 of conical armature 26 by various connection mechanisms including, for example, welding, stapling, crimping, riveting, screwing, bolting, snap-fitting, friction fitting or any other mechanical process. As one alternative example, in one or more arrangements, the guide structure 42 includes a connection feature 162 (not shown) that connects the blade metal stock 126 to the exterior surface 40 of conical armature 26. The connection feature 162 may include, for example, a pocket into which the end of blade metal stock 126 is inserted and held in place as conical armature 26 is rotated.

With the starting end of blade metal stock 126 operably connected to exterior surface 40 of conical armature 26 (e.g., via starting chain 120), furnace 36 and motor 30 are started. Motor 30 rotates drive shaft 70 and drive coupler 68, which engages engagement track 28 and causes conical armature 26 to rotate. Rotation of conical armature 26 pulls blade metal stock 126 through blade metal feed 38 and furnace 36 and into a channel formed by guide structure 42. As blade metal stock 126 passes through furnace 36, blade metal stock 126 is heated to a malleable temperature to facilitate deformation of blade metal stock 126 into the shape of helicoidal blades 12. Due to the connection of the staring end of blade metal stock 126 to exterior surface 40 of conical armature 26, once blade metal stock 126 passes underneath conical armature 26, blade metal stock 126 is pulled and/or bend upwards and around conical armature 26.

In the example shown, the helical orientation of the engagement track 28 and/or guide structure 42 causes the mobile support system 34 and conical armature 26 to be pulled rearward as conical armature 26 is rotated, thereby keeping new blade metal stock 126 aligned with the guide structure 42.

As an illustrative example, in one or more arrangements motor 30 rotate conical armature 26 approximately 3-6 revolutions per hour. Operation continues in this manner with conical armature 26 rotating and moving rearward until the blade metal stock 126 reaches the front end of the conical armature 26 or until the formed helicoidal blades 12 are a desired shorter length.

Once helicoidal blades 12 of a desired length are formed motor 30 and furnace 36 are stopped and the formed helicoidal blades 12 are allowed to cool. In some arrangements, helicoidal blades 12 may be heat treated (e.g., by spraying with water). Blade metal stock 126 is cut from the formed helicoidal blades 12. The formed helicoidal blades 12 are removed from the armature, for example, by holding helicoidal blades 12 in place while rotating conical armature 26 in the opposite direction.

Chirality

It is understood that the disclosed embodiments may be used to form helicoidal blades 12 having either right hand or left hand rotations. In the arrangements shown, system 10 rotates conical armature 26 clockwise, when viewed from back side 20 to create helicoidal shaped blades 12 having a left hand rotation. However, embodiments are not so limited. Rather, it is contemplated that the disclosed arrangements may be adapted to form helicoidal shaped blades 12 having a right hand rotation by having engagement track 28 and/or guide structure 42 formed on conical armature 26 with right hand rotation; positioning furnace 36, blade metal feed 38, and motor on the opposite side of system 10; and rotating conical armature 26 in a counter clockwise direction during operation.

Control Circuit:

In one or more embodiments, system 10 also includes a control circuit (not shown) and/or sensors (not shown) to monitor and/or control various components of system 10. For example, control circuit may be configured to control operations of motor 30 and/or furnace 36 during operation to facilitate manufacture of helicoidal blades 12. The control circuit and sensors are formed of any suitable size, shape and design and are configured to monitor various components of system 10.

In one or more embodiments, sensors may include any type of sensors including, but not limited to voltage sensors, current sensors, temperature sensors, air sensors (e.g., oxygen sensors and carbon dioxide sensors), water sensors, pressure sensors, speed sensors, position sensors, and/or any other known sensor and/or various combinations thereof. In some arrangements, the control circuit may also include a communication circuit (not shown) configured to communicate data with one or more systems communicatively connected to the control circuit. The control circuit may be configured to communicate using various protocols over various networks including, for example, 802.11/Wi-Fi, Wi-Max, Bluetooth, UltraWideband (UWB), 802.15.4/ZigBee, ZWave, GSM/EDGE, UMTS/HSPA+/HSDPA, CDMA, LTE, and/or FM/VHF/UHF networks. In one or more arrangements, the control circuit may be configured to communicate system status and sensor readings, for example, to an operator control station via the communication circuit. Conversely, in one or more arrangements, the control circuit may be configured to receive commands, for example, from such an operator control station.

In one or more arrangements, for example, control circuit may be discreet logic circuits or programmable logic circuits configured and arranged for implementing these operations/activities, as shown in the figures and/or described herein. In certain embodiments, such a programmable circuit may include one or more programmable integrated circuits (e.g., field programmable gate arrays and/or programmable ICs).

Additionally or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of instructions (and/or configuration data). The instructions (and/or configuration data) can be in the form of firmware or software stored in and accessible from a memory (circuit). Certain embodiments are directed to a computer program product (e.g., nonvolatile memory device), which includes a machine or computer-readable medium having stored thereon instructions which may be executed by a computer (or other electronic device) to perform these operations/activities.

As one of skill in the art will appreciate, the system 10 may be incorporated into a variety of larger systems which may facilitate additional functions and advantages. It is further contemplated that while one motor 30 is utilized as described below, an additional motor 30 is used to move the support system 112 in a direction equal and opposite to the direction in which the helicoidal blades 12 are being formed onto conical armature 26. In a further aspect of the embodiment, floor support structures 118 are firmly bolted to the ground and support various stationary items in the system, such as a motor 30 or furnace 36. In a still further embodiment, an overhead chassis or gentry may be utilized to suspend the conical armature 26 from an overhead structure, such as a ceiling, and allow for displacement of the conical armature 26 in a direction equal and opposite to the direction in which the helicoidal blades 12 are being formed onto conical armature 26.

From the above discussion it will be appreciated that the system 10 and related methods of use, presented herein improves upon the state of the art. Specifically, the system 10 and related methods of use presented: that improves upon the state of the art; reduces cost over existing arrangements; that facilitates use of less expensive systems; that reduces the complexity of the manufacturing process; that reduces the amount of time required to manufacture; that reduces the amount of machine time required to manufacture the product; among countless other advantages and improvements.

It will be appreciated by those skilled in the art that other various modifications could be made to the device without parting from the spirit and scope of this disclosure. All such modifications and changes fall within the scope of the claims and are intended to be covered thereby.

SELECTED REFERENCE NUMERALS

10—System
12—Helicoidal Blade (of System 10)
14—Top Side (of System 10)
16—Bottom Side (of System 10)
18—Front Side (of System 10)
20—Back Side (of System 10)
22—Left Side (of System 10)
24—Right Side (of System 10)
26—Conical Armature (of System 10)
28—Engagement Track (of System 10)
30—Motor (of System 10)
32—Drive Assembly (of System 10)
34—Mobile Support System (of System 10)
36—Furnace (of System 10)
38—Blade Metal Feed (of System 10)
40—Exterior Surface (of Conical Armature 26)
42—Guide Structure (of Conical Armature 26)
46—Hollow Interior (of Conical Armature 26)
48—Interior Surface (of Conical Armature 26)
50—Interior Feature (of Conical Armature 26)
68—Drive Coupler (of Drive Assembly 32)
70—Drive Shaft (of Drive Assembly 32)
84—Main Body (of Drive Coupler 68)
86—Connection Member (of Drive Coupler 68)
88—Drive Lug (of Drive Coupler 68)
90—Output Shaft (of Gearbox 124)
92—Exterior Surface (of Main Body 84)
94—Outward End (of Main Body 84)
96—Inward End (of Main Body 84)
98—Opening (of Outward End 94)
100—Drive Lug (of Drive Assembly 32)
102—Peripheral Edge (of Drive Lug 100)
104—End Wall (of Drive Lug 100)
106—Clip (of Drive Assembly 32)
114—Frame (of Mobile Support System 34)
116—Wheels (of Mobile Support System 34)
118—Floor Support Structure (of System 10)
120—Starter Chain (of Conical Armature 26)
122—Connection Assembly (of Mobile Support System 34)
124—Gearbox (of Drive Assembly 32)
126—Blade Metal Stock
130—Frame (of Blade Metal Feed 38)
132—Top Roller (of Blade Metal Feed 38)
134—Bottom Roller (of Blade Metal Feed 38)
136—Rails (of Mobile Support System 34)
146—Base (of Frame 130)
148—Front Vertical Support (of Frame 130)
150—Rear Vertical Support (of Frame 130)
154—Axle (of Connection Assembly 122)
156—Rotatable Connectors (of Connection Assembly 122)
158—Forward End (of Axle 154)
160—Rearward End (of Axle 154)
162—Connection Feature (of Guide Structure 42)
170—Front Portion (of Conical Armature 26)
172—Rear Portion (of Conical Armature 26)
174—Front End (of Conical Armature 26)
176—Rear End (of Front Portion 170)
178—Rear End (of Conical Armature 26)

What is claimed:

1. A system for forming helicoidal blades, comprising:
a conical armature;
the conical armature extending a length from a first end to a second end;
the conical armature having an exterior surface;
wherein the exterior surface of the conical armature is conical in shape;
the exterior surface of the conical armature having a helical shaped guide structure;
the conical armature having one or more engagement tracks in the exterior surface;
a drive coupler;
a motor;
the motor operatively coupled to the drive coupler and configured to rotate the drive coupler when operated;
wherein the drive coupler is configured to engage the one or more engagement tracks of the conical armature and cause the conical armature to rotate when the drive coupler is rotated;
a blade metal feed apparatus configured to provide metal stock to be formed into helicoidal blades;
wherein the blade metal feed apparatus is positioned and aligned to feed the metal stock into the helical shaped guide structure as the conical armature is rotated;

wherein, as the conical armature is rotated, the metal stock is bent around the armature within the helical shaped guide structure to form one or more helicoidal blades;
a mobile support system including a frame and a set of wheels attached to the frame;
wherein the set of wheels are configured to ride along a pair of rails of a floor;
wherein the conical armature is rotatably connected to the frame;
wherein the one or more engagement tracks and the drive coupler are configured and arranged to move the mobile support system along the pair of rails as the conical armature is rotated.

2. The system of claim 1, wherein the system further comprises a furnace;
wherein the furnace is configured to heat the metal stock before it is fed into the helical shaped guide structure.

3. The system of claim 2, wherein the furnace heats the metal stock to at least its forging temperature.

4. The system of claim 2, wherein the metal stock exits the furnace at least at its forging temperature and is placed in connection with the guide structure of the conical armature.

5. The system of claim 2, wherein the metal stock is surface hardened in the furnace.

6. The system of claim 1, wherein the one or more engagement tracks include a first engagement track and a second engagement track; and
wherein the helical shaped guide structure includes a channel formed between the first engagement track and the second engagement track.

7. The system of claim 6, wherein the metal stock is fed into the channel.

8. The system of claim 6, wherein the channel is configured and arranged to receive and hold metal stock for a plurality of helicoidal blades.

9. The system of claim 1, wherein the one or more engagement tracks include a chain attached to the exterior surface of the conical armature; and
wherein the drive coupler includes teeth that engage links of the chain when the drive coupler is rotated by the motor.

10. The system of claim 1, wherein the conical armature has a hollow interior.

11. The system of claim 1, wherein the guide structure of the conical armature is formed into the conical armature.

12. The system of claim 1, wherein the motor is powered by an external power source.

13. The system of claim 1, wherein the system further comprises a starter chain.

14. The system of claim 1, wherein the helical shaped guide structure is a conical helical shape.

15. The system of claim 1, wherein the helical shaped guide structure is a conical logarithmic helical shape.

16. A system for forming helicoidal blades, comprising:
a conical armature;
the conical armature extending a length from a first end to a second end;
the conical armature having an exterior surface;
wherein the exterior surface of the conical armature is conical in shape;
the exterior surface of the conical armature having a helical shaped guide structure;
the conical armature having one or more engagement tracks in the exterior surface;
a drive coupler;
a motor;
the motor operatively coupled to the drive coupler and configured to rotate the drive coupler when operated;
wherein the drive coupler is configured to engage the one or more engagement tracks of the conical armature and cause the conical armature to rotate when the drive coupler is rotated;
a blade metal feed apparatus configured to provide metal stock to be formed into helicoidal blades;
wherein the blade metal feed apparatus is positioned and aligned to feed the metal stock into the helical shaped guide structure as the conical armature is rotated;
wherein, as the conical armature is rotated, the metal stock is bent around the armature within the helical shaped guide structure to form one or more helicoidal blades;
a mobile support system including a frame and a set of wheels attached to the frame;
wherein the set of wheels are configured to ride along a pair of rails on a floor;
wherein the conical armature is rotatably connected to the frame;
wherein when the motor is operated, the mobile support system moves along the pair of rails as the conical armature is rotated.

17. A method for forming helicoidal blades, comprising:
providing a conical armature;
wherein the conical armature extending a length from a first end to a second end;
wherein the conical armature having an exterior surface;
wherein the exterior surface of the conical armature is conical in shape;
wherein the exterior surface of the conical armature having a helical shaped guide structure;
wherein the conical armature having one or more engagement tracks in the exterior surface;
operably connecting a motor to the one or more engagement tracks;
using the motor, rotating the conical armature;
providing metal stock to be formed into helicoidal blades;
feeding the metal stock into the helical shaped guide structure as the conical armature is rotated;
wherein as the conical armature is rotated, the metal stock is bent around the armature within the helical shaped guide structure to form one or more helicoidal blades;
wherein the conical armature is rotatably connected to a frame of a mobile support system configured to move along a pair of rails on a floor; and
moving the mobile support system along the pair of rails by rotating the conical armature.

18. The method of claim 17, further comprising heating the metal stock before it is fed into the helical shaped guide structure.

19. The method of claim 18, wherein the heating of the metal stock includes heating the metal stock to at least its forging temperature.

20. The method of claim 18, further comprising surface hardening the metal stock.

21. The method of claim 17, wherein the one or more engagement tracks includes a first engagement track and a second engagement track; and
wherein the helical shaped guide structure includes a channel formed between the first engagement track and the second engagement track.

22. The method of claim 21, wherein the metal stock is fed into the channel.

23. The method of claim 21, wherein the channel is configured and arranged to receive and hold metal stock for a plurality of helicoidal blades.

24. The method of claim 17, wherein the one or more engagement tracks include a chain attached to the exterior surface of the conical armature; and wherein the motor is operably connected to a drive coupler having teeth that engage links of the chain when the drive coupler is rotated by the motor.

* * * * *